(12) United States Patent
Metternich

(10) Patent No.: US 6,390,743 B1
(45) Date of Patent: May 21, 2002

(54) LOCKING DEVICE FOR CONTAINERS ON A VEHICLE

(75) Inventor: Heinz Rudiger Metternich, Hamburg (DE)

(73) Assignee: Hamburger Patent Schmiede GmbH, Hamburg (DE)

(*) Notice: Subject to any disclaimer, the term of this patent is extended or adjusted under 35 U.S.C. 154(b) by 0 days.

(21) Appl. No.: 09/674,758

(22) PCT Filed: Feb. 10, 2000

(86) PCT No.: PCT/EP00/01086

§ 371 Date: Dec. 14, 2000

§ 102(e) Date: Dec. 14, 2000

(87) PCT Pub. No.: WO00/51842

PCT Pub. Date: Sep. 8, 2000

(30) Foreign Application Priority Data

Mar. 4, 1999 (DE) ..................................... 299 03 940 U

(51) Int. Cl.[7] ................................................. B60P 7/08
(52) U.S. Cl. ............................................ 410/82; 410/76
(58) Field of Search .............................. 410/82, 83, 73, 410/76; 280/406.1; 248/500, 503

(56) References Cited

U.S. PATENT DOCUMENTS

| 2,439,423 | A | * | 4/1948 | Fowler | 410/82 |
|---|---|---|---|---|---|
| 3,193,238 | A | * | 7/1965 | Sherrie | 410/82 |
| 4,108,081 | A | | 8/1978 | Blanz | 410/82 |
| 4,352,613 | A | | 10/1982 | Bertolini | 410/82 |
| 5,141,372 | A | * | 8/1992 | Donner | 410/82 |
| 5,893,692 | A | * | 4/1999 | Asanuma | 410/83 |
| 6,092,967 | A | * | 7/2000 | Schulz et al. | 410/82 |

FOREIGN PATENT DOCUMENTS

| DE | 7136868 U | 1/1972 |
|---|---|---|
| DE | 2060840 B2 | 10/1976 |
| DE | 29712120 U1 | 10/1987 |
| DE | 19718528 C1 | 12/1998 |
| DE | 19818278 A1 | 12/1998 |
| EP | 0051107 B1 | 6/1981 |

\* cited by examiner

*Primary Examiner*—Stephen T. Gordon
(74) *Attorney, Agent, or Firm*—Venable; John P. Shannon; Chad C. Anderson

(57) ABSTRACT

The invention relates to a device for locking containers on vehicles. The device has a twist lock which is moveably retained in a lock housing and a drive mechanism for moving the twist lock between the release and locking positions. The twist lock (10) is mounted in the lock housing in such a way that the twist lock is axially moveable (14) and can rotate about its axis (13).

2 Claims, 2 Drawing Sheets

LOCKING DEVICE FOR CONTAINERS ON A VEHICLE

BACKGROUND OF THE INVENTION

The invention relates to a device for locking containers on a vehicle, comprising a twist lock that is retained movably inside a lock housing, as well as a drive mechanism for moving the twist lock back and forth between a release position and a locking position. The locking device is used for locking a container onto the loading surface or the chassis of a vehicle, wherein the locking components project in upward direction and the outline matches the elongated hole in the container mounting.

A device for locking containers to the front of a vehicle chassis (frontal lock) is already known (European Patent 0 051 107 B1). The device comprises a twist lock that can be moved inside a guide, approximately parallel to the longitudinal axis of the vehicle chassis, between a locking and a release position, and is connected to an actuation lever that can be pivoted inside a holder. The guide and holder in this case are jointly mounted on a mounting plate that is oriented perpendicular to the movement plane of the actuation lever, wherein the mounting plate is located on the side of the guide that faces the locking component of the twist lock.

Thus, the transport of containers on the chassis of a vehicle requires a locking operation. It is essential for this operation that the container be placed at the correct location onto the chassis. An operator must then manually turn a lever to secure the locking component in the elongated hole for the drive mechanism. The problem with this operation is that it must be performed manually for each individual corner mounting.

SUMMARY OF THE INVENTION

It is the object of the present invention to automatically lock a container onto the chassis of a vehicle.

This object is achieved in that the twist lock is positioned inside the lock housing, such that it can move in axial direction as well as rotate around its axis.

The twist lock portion that is located inside the lock housing is designed to have a gear rim around its circumference, as well as a slope that increases tangentially relative to the circumference of the twist lock.

A wedge-type carriage is mounted inside the lock housing, such that it can be moved back and forth, can be pivoted and can be driven between a release position and a locking position by means of a drive mechanism (hydraulic, pneumatic, electromechanical or the like).

The wedge-type carriage is designed to have a gear rack that engages in the gear rim of the twist lock during part of the movement of the wedge-type carriage and turns the twist lock with a 90° rotation.

The wedge-type carriage is designed to have a slope or wedge, which is arranged such that it can slide and engage with the slope of the twist lock during a different movement of the wedge-type carriage and which causes the twist lock to move in axial direction.

In accordance with the invention, a drive mechanism is provided that inserts the locking component into the associated elongated hole in the container mounting, turns this component and then ensures that the component is in the locked position and remains in this position until it is released again.

We are dealing with twist lock movements that are opposing each other. It is therefore easily conceivable that these movements are carried out by means of separate drive mechanisms. However, doing so would require considerably equipment expenditure for realizing the basic idea of the present invention.

According to a modification of the present invention, a single drive mechanism can be used to generate the necessary movements, as previously described. It means a single device can be used to realize the individual operating movements in different directions. Also, the control can be coordinated with respect to time.

According to a particularly preferred embodiment of the invention, a single drive mechanism is used, which carries out only linear movements. This type of a drive mechanism can be a so-called diaphragm accumulator drive, which has been in use for some time in automobile engineering for applying the brake. The drive mechanism is supplied with energy via pneumatic lines, wherein the compressed air ensures that it is constantly maintained in the operating position. If the compressed air escapes, the diaphragm of the diaphragm accumulator returns with the aid of a spring to the balanced condition. When used with a brake, this diaphragm accumulator functions to keep the brake shoes away from the brake disk. The braking operation is initiated by removing the pneumatic pressure, so that the brake shoes can grip around the brake disk and bring the vehicle to a stop.

A diaphragm accumulator of this type is preferably used with the present invention to generate the desired movement for inserting the locking component into the elongated hole of a mounting by way of a wedge-shaped control component. The drive mechanism also carries out the rotational movement with the aid of a lever on the locking component and a gear rack on the control component.

It is apparent that all necessary movements can be carried out with the aid of a simple back and forth movement of the control component. The individual movements are carried out via surfaces, preferably level wedge-type surfaces and toothed surfaces with a complementary design. Thus, a total mechanism is created, which performs the necessary controlled movements with the simplest, mechanical means. This is achieved without having to worry about difficulties during the rough practical operations of the container transport.

On a vehicle designed to operate with the corresponding locking mechanisms, a container can easily be locked in place on the loading surface of the chassis, such that it is operationally safe. Once the container is in the predetermined position, only a short pulse is required to remove the pressure medium from the diaphragm accumulators, so that the required locking movements can be performed.

Based on the device according to the invention, the activation can occur with a wire connection from the driver cab. Of course, other transmission methods, such as the electromagnetic or infrared transmission of signals, are suited for this as well.

It is also possible to detect the end positions for the back and forth moving control component and to transmit these positions to the driver cab, so that the individual operations can be monitored there.

Other drive mechanisms can also be used, for example piston-cylinder drive mechanisms, which are operated with a pressure means.

BRIEF DESCRIPTION OF THE DRAWINGS

The invention is explained in the following with an example and with the aid of the drawings.

DETAILED DESCRIPTION OF THE PREFERRED EMBODIMENT

Figure 1:
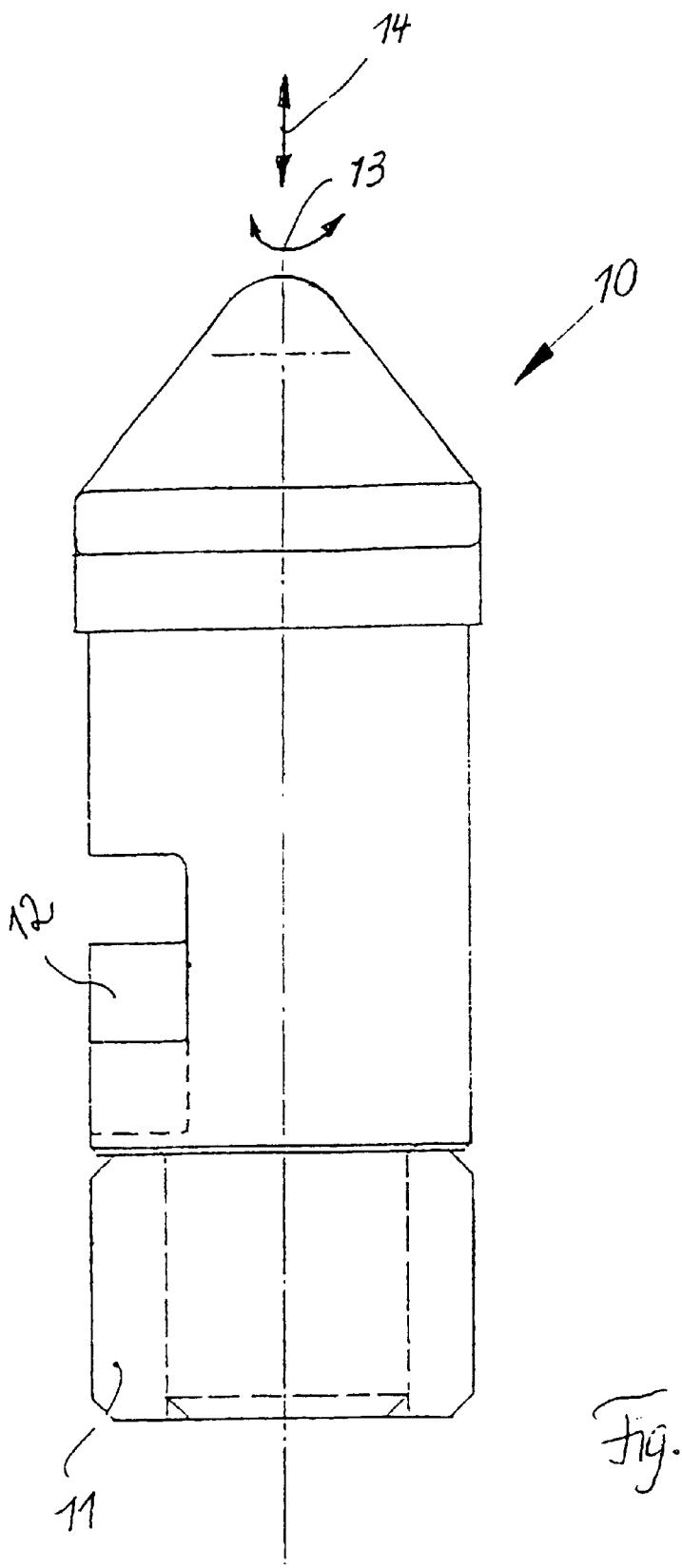
FIG. 1 Shows a view in longitudinal direction of a twist lock according to the invention.
Figure 2:
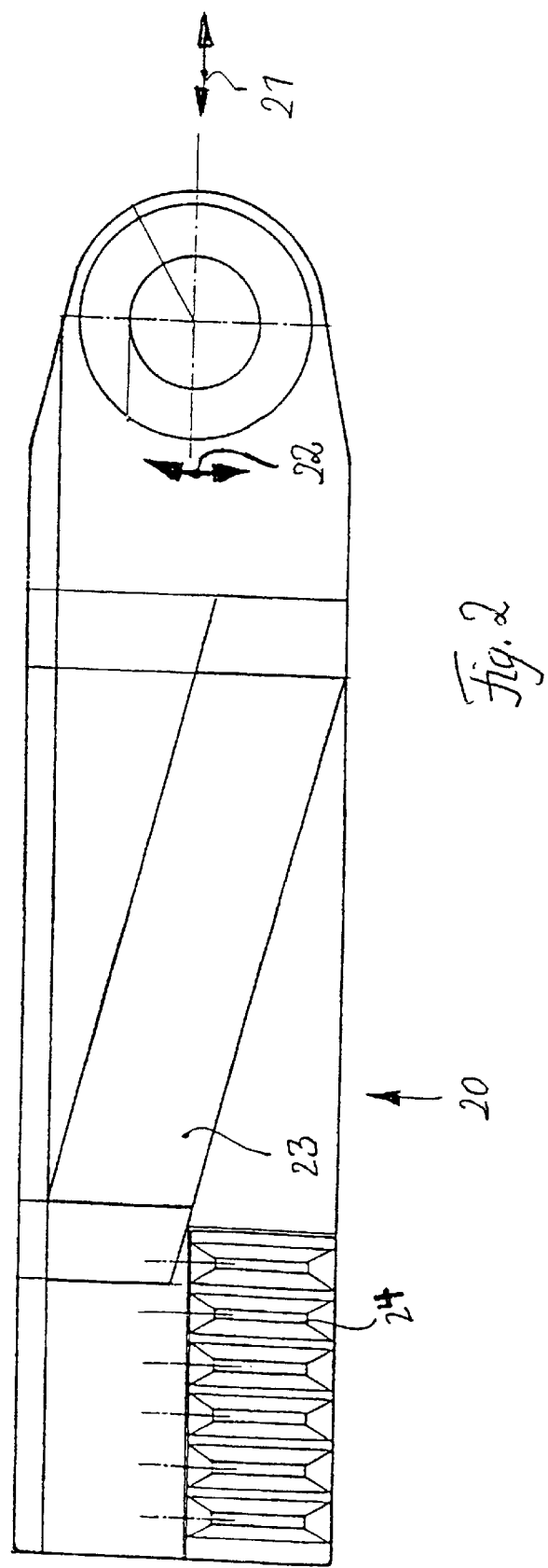
FIG. 2 Shows a view from the side of a wedge-type carriage.

The device according to the invention essentially comprises a twist lock 10 (FIG. 1) and a wedge-type carriage 20 (FIG. 2). These parts are positioned inside the lock housing, not shown herein, and are activated by means of a drive mechanism that is also not shown herein.

The upper region of twist lock 10 is shaped in the standard way known from locking devices used for locking a container onto a vehicle with the aid of standard mountings.

In order to explain the movement, an arrow 14 indicates that the twist lock 10 can perform axial movements in both directions. With the aid of arrow 13, it is indicated that the twist lock 10 can also perform rotating or pivoting movements around its longitudinal axis. Insofar, twist lock 10 does not differ from standard twist locks, which can also perform these four movements for a locking operation.

The lower part of twist lock 10, meaning the part located inside the lock housing that is not shown here, is designed to have a pinion gear 11. It is apparent that the twist lock 10 performs a rotating movement if a toothed wheel or a gear rack engages in this pinion gear.

The twist lock 10 furthermore is designed with a slope 12 on the lower part that is located inside the housing, which slope runs tangential to the outside surface of the twist lock 10. It is quite obvious that if a part makes contact with this slope 12 and if this part is moved perpendicular to the paper plane, the twist lock 10 performs an axial movement.

With a corresponding positioning in axial and radial direction, the twist lock 10 can carry out the above-described movements without a problem. Furthermore, it must be ensured that the twist lock 10 can perform the axial movements without disturbing the engagement of a gear part in the pinion gear 11 of twist lock 10.

FIG. 2 shows a view of the wedge-type carriage 20, which essentially has the shape of a rod or cube, meaning it can without question have a square cross section. The wedge-type carriage 20 is connected on its right end with a drive mechanism, which is not shown in detail here but engages in a passage, so that the twist lock carriage 20 can perform a back and forth movement, as indicated with the double arrow 21. However, with a drive in the direction of arrow 21, the wedge-type carriage 20 can also perform pivoting movements, as indicated by the double arrow 22. Drive mechanisms of this type are available and can derive the desired movements from a linear drive mechanism.

The opposite end of the wedge-type carriage 20 is provided with a toothing or a gear rack 24, wherein the teeth are shaped such that they engage in the pinion gear 11 for a driving movement. The wedge-type carriage 20 is correspondingly placed in a position where it essentially occupies an angle of 90° relative to the axis of twist lock 10.

The center region of wedge-type carriage 20 is designed to have a slope or projection or wedge 23, which rises slightly in longitudinal direction of the wedge-type carriage 20 and is designed to match the slope 12 of twist lock 10. The respective position of wedge-type carnage 20 does not present a problem because known means are used for this. These means permit the movement in longitudinal direction as well as the pivoting movement of the wedge-type carriage 20.

It is quite apparent that because of the movement in the direction of arrow 21, the wedge-type carriage 20 can cause a rotational movement of twist lock 10 via the gear meshing 22, 11.

It is furthermore apparent that owing to the movement of the wedge-type carriage in the direction of arrow 21 and the arrows 22, an axial movement of the twist lock 10 can be effected via the thrust engagement between wedge 23 and slope 12.

Accordingly, the locking operation can be carried out such that the twist lock 10 is moved in upward direction while the wedge-type carriage 20 is moved to the left. The upper part of twist lock 10 can thus be inserted into a mounting. With an additional movement of the wedge-type carriage 20, the twist lock 10 performs a rotating movement, so that the upper part of the twist lock 10 secures the container in the mounting. In this position, the container is locked on the vehicle and can thus be transported.

During the unlocking operation, the above-described operational steps occur in the reverse order.

What is claimed is:
1. A device for locking containers on vehicles, the device having a twist lock with a part to be retained movably inside a lock housing, as well as a drive mechanism for moving the twist lock back and forth between a release position and a locking position, comprising:
 the twist lock having an axis and a circumference, the twist lock being movable in an axial direction and rotatable about its axis;
 the part of the twist lock to be located inside the lock housing having a gear rim along the circumference with a sloped portion extending tangentially to the circumference and sloping tangentially; and
 a wedge-type carriage to be mounted within the lock housing, said wedge-type carriage being movable and pivotable, and driven by the drive mechanism between positions corresponding to the release position and the locking position to define a movement of the wedge-type carriage,
 wherein the wedge-type carriage includes a gear rack for engaging the gear rim of the twist lock during a portion of the movement of the wedge-type carriage such that the twist lock is rotated 90° about its axis, the wedge-type carriage further including a wedge portion arranged such that the wedge portion engages the sloped portion of the twist lock during another portion of the movement of the wedge-type carriage such that the twist lock is moved axially.

2. The device of claim 1, wherein the drive mechanism is one of a hydraulic drive mechanism, a pneumatic drive mechanism, and a electromechanical drive mechanism.

* * * * *